United States Patent
Heilig et al.

(10) Patent No.: US 6,887,420 B2
(45) Date of Patent: May 3, 2005

(54) NON-STICK COATED MOLDS

(75) Inventors: Gerhard Heilig, Bergisch Gladbach (DE); Thomas Gross, Wermelskirchen (DE); Helmut Steinberger, Leverkusen (DE)

(73) Assignee: GE Bayer Silicones GmbH & Co. KG, Erkrath (DE)

( * ) Notice: Subject to any disclaimer, the term of this patent is extended or adjusted under 35 U.S.C. 154(b) by 323 days.

(21) Appl. No.: 10/277,404

(22) Filed: Oct. 22, 2002

(65) Prior Publication Data

US 2003/0080458 A1 May 1, 2003

(30) Foreign Application Priority Data

Oct. 29, 2001 (DE) .......................... 101 53 352

(51) Int. Cl.$^7$ .......................... B28B 7/36; B29B 13/00; B05D 1/00; B29C 53/32; B32B 15/02
(52) U.S. Cl. ...................... 264/338; 264/219; 428/34.1; 428/35.7; 428/35.8; 428/36.92; 428/220; 428/403; 428/405; 428/446; 425/317; 427/133
(58) Field of Search ................... 264/219, 338; 428/34.1, 35.7, 35.8, 36.92, 220, 403, 405, 446; 425/317; 427/133

(56) References Cited

U.S. PATENT DOCUMENTS 3,874,862 A * 4/1975 Bickling et al. ................ 65/26
3,986,997 A 10/1976 Clark .................... 260/29.2 M
4,532,096 A 7/1985 Bogner et al. .............. 264/109

FOREIGN PATENT DOCUMENTS

EP 1 000 989 5/2000
WO 00/69976 11/2000

* cited by examiner

*Primary Examiner*—Stephen J. Lechert, Jr.
(74) *Attorney, Agent, or Firm*—Norris McLaughlin & Marcus PA

(57) ABSTRACT

The invention provides non-stick coated molds, a process for the preparation thereof and their use for the production of plastics molded parts, particularly for the production of molded parts made of polyurethane foam.

9 Claims, No Drawings

NON-STICK COATED MOLDS

BACKGROUND OF THE INVENTION

The present invention is directed to non-stick coated molds, a process for the preparation thereof and a process for the production of plastics molded parts in these non-stick coated molds, and particularly molded parts made of polyurethane foam.

Plastics molded parts are usually produced in plastics molds (e.g. made of synthetic resin or epoxide resin) or metal molds (e.g. made of steel or aluminium). In order to be able to take out or to remove the molded part or adhering residues of product from these molds after production, in an easy manner which does not leave any residues or cause damage, the mold is generally coated with a mold release agent prior to introducing the raw materials into the mold.

It is well-known that wax-like substances are used advantageously as mold release agents during the production of molded parts, e.g. made of polyurethanes (PUR). These mold release agents are applied in a separate working process, e.g. as pure wax by rubbing or painting onto the mold. Introduction by means of spray application, where the wax is emulsified and/or dissolved in solvents and finely sprayed as an aerosol onto the shape-providing surfaces of the mold, is conventionally and very widely used in order to produce a closed, uniform surface film.

Depending on the type of raw materials being processed and/or the method of production, various contour-sharp and low-residue mold release procedures can be performed with such mold release agents. Very frequently, the mold has to be treated with the mold release agent before producing each individual molded part in order to ensure perfect mold release after production.

The processing techniques which are conventionally used for PUR involve a complex chemical reaction taking place in the mold, in which the PUR components, i.e. the polyol and the isocyanate, react in a polyaddition reaction. Shape-production proceeds in parallel with the progress of the chemical reaction. All the starting materials used, and also all the reaction intermediates, have an effect on the surface of the mold. The PUR molded part being produced exhibits good to very good adhesion to the metals or plastics normally used in the construction of molds, which makes a relatively clean mold release procedure difficult to impossible. Thus, the use of mold release agents, in particular during the mold processing of PUR, is generally essential.

It is well-known that, when producing rigid PUR molded parts, the use of mold release agents is not required when particular active substances (i.e. IMRs, or Internal mold release agents) which lead to an automatic separating effect are added to the PUR raw materials. However, this method can be used only in special cases. In particular, this technology cannot be used when producing flexible PUR molded foams, due to the chemical nature of the agents, so (external) mold release agents have to be used in any case in this sector.

Furthermore, on various occasions attempts have been made to avoid the use of mold release agents by the application to molds of (semi-) permanent coatings made, for example, of polytetrafluoroethylene (PTFE). However, these coatings are not cost-neutral with regard to standard mold release agents. Furthermore, the repair of damaged (semi-)permanent surface films is only possible at great expense and generally cannot be performed on site.

The repeated application of (external) mold release agents to the surface of molds, however, has a number of chemical, technical, ecological and economic disadvantages.

The treatment of molds with mold release agents represents an undesired additional operational expense and additional operational costs in a production process. Depending on the frequency and amount of mold release agent used, high additional auxiliary costs are often produced.

In particular when applying a mold release agent to the surface of a mold in a spray process, effective ventilation of the workplace and effective breathing equipment for the processors are required for occupational health reasons, wherein this involves considerable technical and investment input, particularly in the case of large molds.

Mold release agents require a drying time after application to the surface in order to evaporate the solvent before the raw materials being processed can be introduced into the mold. Otherwise, the solvent left behind interferes with processing of the molded part.

Mold release agents, in addition to the waxes and solvents, very often contain auxiliary substances such as e.g. detergents which have an effect on the physico-chemical progress of shape-providing and reaction during processing of the raw materials and thus can have a negative effect on the resulting properties of the molded part.

The mold release agent is generally applied manually, which leads to an irregular surface and makes precise control of the amount used difficult. If the mold release agent is applied irregularly, residues of the molded part may remain behind, at poorly wetted places on the surface, during the mold release process.

In any mold release process, residues of the mold release agent are left adhering to the molded part and the surface of the mold; over time, a generally irregular build-up of a layer of mold release agent is produced on the surface of the mold. This layer interferes with the accuracy of the contours and forces the user to perform complicated and cost-intensive cleaning procedures which, depending on the situation, sometimes have to be performed at very short time intervals (i.e. weekly).

Molded parts often need a subsequent, and separate, cleaning procedure before further processing.

Residues of mold release agent, in particular when applied by spraying, often lead to severe soiling of the workplace.

It has now been found that coating the surface of the mold with a coating material which contains nanoscale colloidal silicon dioxide and/or colloidal alkylsilsesquioxane in aqueous/alcoholic suspension leads to mold surfaces which eliminate the disadvantages mentioned above and contribute to substantial simplification of the production of a molded part in a mold.

This (semi-)permanent coating of mold surfaces has the following advantages:

It requires the use of small amounts of the coating.

The application process is time-saving and cost-effective.

The coating is contour-accurate.

Coating of all materials conventionally used when making molds is possible.

Temperature management of the mold is not affected.

It survives a number of production cycles without requiring post-processing. Thus, working time required for removing the mold release agent is saved.

Special workplace ventilation and other occupational health measures may not be required.

The cycle of evaporation and drying times to evaporate the solvent is not required.

The time between cleaning cycles can be greatly extended.

The coating is chemically inert and has no effect on the process for molded part production.

In the event of uniform application, there is no risk of partial adhesion by the molded part.

The coating remains adhere entirely to the surface of the mold.

Subsequent cleaning of the molded part is not required.

There is no build-up of mold release agent residues in the mold.

Touching up damaged coatings is possible on site at low cost.

Soiling of the workplace by mold release agent residues is avoided.

In addition to these advantages, the coating can be colored which permits (a) simple color differentiation between different molds and/or parts and/or (b) use of a simple visual inspection sample for detecting any surface damage.

SUMMARY OF THE INVENTION

The present invention provides for a mold having a non-stick coating for the processing of plastics, wherein the non-stick coating is based on organomodified nanoscale $SiO_2$ particles. The present invention also relates to a process for the production of these molds comprising: (1) applying a coating to the internal surface(s) of a mold which is made of metal or plastic, wherein the coating comprises nanoscale colloidal silicon dioxide and/or colloidal alkylsilsesquioxane in aqueous/alcoholic suspension, and then, (2) curing the coating. The cured coating contains, in addition to silicon dioxide, partially organic substituted silicate structures which are produced by the reaction of $SiO_2$ particles which contain tetrafunctional silicon atoms with organofunctional trialkoxysilanes.

In particular, the non-stick coating agent is prepared by reacting:
a) one or more colloidal silicon dioxide solutions with an average particle size of 5 to 150 nanometers diameter, preferably 10 to 30 nanometers diameter;
b) one or more organofunctional trialkoxysilanes of the general formula R'—Si(OR)$_3$,
   wherein:
      R': represents an optionally fluorinated alkyl substituent with 1 to 6 carbon atoms, vinyl, acryloyl, methacryloyl, γ-glycidoxypropyl, or γ-methacryloxypropyl substituents; preferably methyl, ethyl, acryloyl or methacryloyl substituents, or fluoroalkyl substituent with 1 to 6 carbon atoms; and most preferably methyl, methacryloyl, 3,3,3-trifluoropropyl, nonafluorobutyl or tridecafluorohexyl substituents;
      and
      each R: may be the same or different and represents an alkyl substituent with 1 to 8 carbon atoms; preferably methyl, ethyl, isopropyl or sec-butyl substituents; or mixtures of different trialkoxysilanes may also be used;
c) one or more pH-regulating additives;
and, optionally,
d) a catalyst.

Starting components a) for preparing the coating agent used according to the invention are aqueous colloidal silicon dioxide solutions with an average particle size of 5 to 150 nanometers diameter. Silicon dioxide dispersions with an average particle size of 10 to 30 nanometers are preferably used in order to obtain dispersions with high stability. These silicon dioxide dispersions are prepared by known processes and are commercially obtainable. Dispersions of colloidal silicon dioxide can be purchased from various manufacturers such as DuPont, Nalco Chemical Company or Bayer AG. Colloidal dispersions of silicon dioxide are obtainable in either an acidic or alkaline form. The acidic form is preferably used for preparation of the coating materials because these provide the coatings with better properties than do the alkaline forms.

Starting component b) comprises one or more of the organofunctional trialkoxysilanes as described above. It is preferred that b) comprise at least 70 wt. % of trialkoxyalkylsilanes, with the balance being other organofunctional trialkoxysilanes such as, for example, trialkoxyvinylsilanes or trialkoxyacryloylsilanes. Preferred trialkoxyalkylsilanes include compounds such as, for example, trialkoxymethylsilane, trialkoxyethylsilane or trialkoxypropylsilane; and most preferably trialkoxymethylsilane.

Starting components c) for preparing the coating agent used according to the invention are pH-regulating additives. These are generally inorganic or organic acids. The mixtures contain sufficient amounts of acid to maintain the pH in the range between 3.0 and 6.0 during the reaction. The pH is held in this range in order to avoid premature condensation and gelling of the mixture, to extend the storability of the mixture, and to obtain optimal properties for the composition after curing. Suitable acids are both organic and inorganic acids such as, for example, hydrochloric acid, chloroacetic acid, acetic acid, citric acid, benzoic acid, formic acid, propionic acid, maleic acid, oxalic acid, glycolic acid and the like. The acids are preferably added either to the trialkoxysilane or to the colloidal silica prior to mixing with the trialkoxysilane. Buffer systems may also be used to adjust the pH. An example of a suitable buffer system comprises a hydrochloric acid/ammonium chloride system.

Catalyst d) is optional, but is preferably added to increase the rate of curing. Suitable examples of catalysts include tetraalkylammonium salts of organic acids such as tetrabutylammonium acetate or tetrabutylammonium formate, Lewis acids such as aluminium chloride, sodium acetate, organic borates such as methyl borate or ethyl borate, titanates such as tetraisopropoxy titanate, metal acetylacetonates such as aluminium acetylacetonate or titanium acetylacetonate, etc.

Coating materials according to the invention are prepared at temperatures of 10 to 40° C., preferably at temperatures of 20 to 30° C. Hydrolysis of the silanes used usually takes place over the course of several hours with addition of the components mentioned. It should be noted here that the rate of reaction or of hydrolysis depends on the type of alkoxy compound used. Methoxysilanes react the fastest, while ethoxysilanes and propoxysilanes react somewhat slower. An alcohol is normally added directly to the reaction mixture in order to regulate condensation and to stabilise the sol being produced.

The composition obtained after reaction normally contains about 10 to about 50 wt. % of solids (based on the total weight of the composition), wherein the solids comprise about 10 to 70 wt. % of colloidal silicon dioxide (based on 100% by weight of solids) and about 30 to 90 wt. % of silanol partial condensate or siloxanol (based on 100% by weight of solids). The silanol partial condensate is preferably produced by condensation of monomethyltrisilanol, but may also be obtained by the co-condensation of monomethyltrisilanol with monoethyltrisilanol, monopropyltrisilanol, monovinyltrisilanol, mono-γ-methacryloxypropyltrisilanol, mono-γ-glycid-oxypropyltrisilanol, or mixtures thereof.

The partial condensate is formed in situ by adding the corresponding trialkoxysilane to the aqueous colloidal dispersion of silicon dioxide. Suitable trialkoxysilanes are those which contain methoxy, ethoxy, isopropoxy, and sec.-butoxy substituents. Following formation of the silanol in acidic aqueous solution, the hydroxyl substituents are condensed with the formation of Si—O—Si bonds. Condensation does not proceed to completion. A certain number of silicon-bonded hydroxyl groups remain and these keep the organopolysiloxane formed in solution in the aqueous/alcoholic medium. This soluble partial condensate can be characterised as a siloxanol polymer with at least one hydroxyl group bonded to a silicon atom per every three SiO units.

During the curing process for the non-stick coating, these remaining hydroxyl groups condense in order form a silsesquioxane of the formula R—SiO$_{3/2}$.

Coatings according to the invention can be cured by thermal or photochemical (UV) treatment, wherein the particular method used depends on the nature of the coating and/or on the technical boundary conditions present on site.

Coatings according to the invention can be applied to all commonly used mold materials such as, e.g., steel, aluminium, plastics, etc.

Preferred mold materials are, for example, high-strength aluminium alloy AlZnMgCu 1.5, type 3.4365, unalloyed tool steel C 45, type 1.1730, corrosion resistant core-hardened steel X 42, type 1.2083 or other grades of steel used for the construction of tools. Depending on the mold material, separate cleaning and pretreatment of the surface, e.g. by the application of a primer, may not be necessary.

In addition, 1% strength alcoholic solutions of the partial hydrolysates of organofunctional silanes such as, for example, vinyltrimethoxysilane, vinyltriethoxysilane, γ-glycidoxypropyl-trimethoxysilane, γ-methacryloxypropyltrimethoxysilane, γ-glycidoxypropyltriacetoxysilane, tris(glycidoxypropyl)methoxysilane, γ-aminopropyltrimethoxysilane, γ-aminopropyltriethosysilane and mixtures thereof may be used, for example, as primers. Preferably γ-glycidoxypropyltrimethoxysilane or γ-aminopropyltrimethoxysilane are used as primers.

For this purpose, the silanes are generally dissolved in an alcohol as mentioned above, such as for example methanol and ethanol, or another polar solvent, and applied to the cleaned mold in a thin layer using a brush or sprayed on using a spray device, and then allowed to evaporate at room temperature. Other suitable alcohols include isopropanol, n-butanol, and isobutanol.

It is advantageous, but not essential, to condition the dried primer at mild temperatures, e.g. at 60 to 90° C., for a period of 15 to 30 minutes in order to ensure particularly good adhesion of the subsequently applied coating to the substrate material. Molds coated according to the invention can be used for the production of molded parts made from a wide variety of thermoplastic and thermoset plastics. Examples are polyethylene, polypropylene, PVC or polyurethane.

Particular advantages are exhibited when producing molded parts from polyurethane, in particular polyurethane foam, very particularly flexible polyurethane foam.

The invention is further illustrated but is not intended to be limited by the following examples in which all parts and percentages are by weight unless otherwise specified.

EXAMPLES

Example 1

Preparation of an Organosilsesquioxane Coating Solution 19.8 g of acetic acid, 210 g of distilled water and 227 g of isopropanol were added to 300 g of colloidal silica with a SiO$_2$ content of 30 wt. %. After mixing the components thoroughly, 900 g of methyltriethoxysilane were added, and the mixture was heated to 60° C. with stirring. The mixture was held at this temperature for 4 hours, then another 1200 g of isopropanol were added. After cooling to room temperature, the solution was filtered. The slightly opaque, colloidal solution prepared in this way was used as the coating agent in Example 4.

Example 2

Preparation of an Organosilsesquioxane Coating Solution 250 g of methyltrimethoxysilane, 160 g of colloidal silica with a SiO$_2$ content of 30 wt. %, 40 g of water and 1.5 g of acetic acid were mixed in a reaction vessel, and then a mixture of 250 g of n-butanol and 250 g of isobutanol were added. This mixture was stirred at room temperature for 16 hours and then filtered. The slightly opaque, colloidal solution prepared in this way was used as the coating agent in Example 6.

Example 3

Comparison Example; Use of a Conventional Mold Release Agent

Molded parts were produced from a commercially available standard flexible molding foam system (Bayfit® VP.PU 20SA71/Desmodur® VP.PU 70SA69, Bayer AG). The internal walls of a laboratory mold and the inserts used (conventional laboratory mold made of aluminium sheets and steel frames with aluminium inserts (200×200×40 mm) was treated, before each introduction of the liquid PUR reaction mixture, with a standard wax or a standard mold release paste (P 180-52, Acmos-Chemie GmbH & Co., D-28199 Bremen) in order to ensure perfect mold release of the molded item after production.

When the mold was not treated appropriately prior to the production of each molded part, the PUR molded part adhered to the laboratory mold after the second or third mold release procedure, initially only in some places and after further mold release procedures over most of the area. During the first mold release procedure, initially only relatively small particles from the surface of the molded item remained on the surface of the laboratory mold. During further mold release procedures, severe adhesion occurred, to the extent that removal of the molded part was no longer possible without causing damage.

Example 4

Production of a Coating According to the Invention

Adhering residues were removed from the laboratory mold used in Example 3 by sand-blasting, and then the mold was coated with the coating agent according to the invention from Example 1 by applying with a brush. The solvent was allowed to evaporate by leaving the mold open for 10 minutes at room temperature and the coating was then cured by heating for 20 minutes in a heating furnace at 130° C. The mold prepared in this way was used to produce molded parts. Separate application of mold release agent was not performed. Molded parts were produced over a period of several days. Each molded part could be released with no problem, leaving no residue and causing no damage.

Example 5

Comparison Example;

Use of a Conventional Mold Release Agent

The internal wall of an aluminium mold for producing front face insulation in the automobile sector was treated with a standard mold release agent solution before each introduction of the liquid PUR reaction mixture in order to ensure perfect mold release of the molded item after production.

When the mold was not treated appropriately prior to the production of each molded part, the PUR molded part adhered to the laboratory mold after the second or third mold release procedure, initially only in some places, and after further mold release procedures, over most of the surface area of the mold. During the first mold release procedure, first of all relatively small particles remained on the surface of the laboratory mold. During further mold release procedures, severe adhesion occurred, to the extent that removal of the molded part was no longer possible without causing damage.

Example 6

Coatings According to the Invention

Example 6A

Adhering residues were removed from the aluminium mold used in Example 5 by sand-blasting, and then coated on the faces making contact with the PU foam by spraying with the coating solution with the composition according to the invention from Example 2. Then, the mold was heated to 90° C. for 1 hour. Afterwards, the mold was used to produce PUR molded foam parts. 15 molded parts were produced daily for a period of 2 days. Each molded part could be released with no problem, leaving no residue and causing no damage.

The test described above was repeated using the following coating solution:

Example 6B 0.2 g of acetic acid were added to 200 g of a commercially available colloidal dispersion of silicon dioxide with a pH of 3.1, a $SiO_2$ content of 34 wt. %, a particle size of approximately 15 nanometers, and with a $Na_2O$ content of less than 0.01 wt. %. 138 g of methyltrimethoxysilane were added to this and stirred. Methanol and methyltrisilanol were then formed. After about 1 hour, the pH stabilised at 4.5. The reaction mixture was allowed to stand for a further 4 days in order to ensure formation of the partial condensate in the silica sol/water/methanol mixture. This mixture contained 40 wt. % of solids, of which 50 wt. % consisted of $SiO_2$ and the other half consisted of methylsilsesquioxane.

Results:

| Example | Use of Mold release agent | Coating | Number of problem-free mold releases |
|---------|---------------------------|---------|--------------------------------------|
| 3       | Yes                       | No      | 2–3*                                 |
| 4       | No                        | Yes     | 55                                   |
| 5       | Yes                       | No      | 2                                    |
| 6B      | No                        | Yes     | 30                                   |

*PU particles adhere during the 2$^{nd}$ mold release procedure and lead to surface damage of the molded part during the 3$^{rd}$ mold release procedure Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A mold having a non-stick coating wherein the non-stick coating comprises organomodified nanoscale $SiO_2$ particles.

2. The mold of claim 1, wherein the non-stick coating additionally comprises colloidal alkylsilsesquioxane in aqueous/alcoholic suspension.

3. The mold of claim 1, wherein the non-stick coating comprises the reaction product of:
   a) one or more colloidal silicon dioxide solutions with an average particle size of 5 to 150 nanometers diameter,
   b) one or more organofunctional trialkoxysilanes corresponding to the general formula:

$$R'\!-\!Si(OR)_3$$

wherein:
   R': represents an optionally fluorinated alkyl substituent having 1 to 6 carbon atoms, a vinyl substituent, an acryloyl substituent, a methacryloyl substituent, a γ-glycidoxypropyl substituent, or a γ-methacryoxypropyl substituent, and
   each R: represents an alkyl substituent having 1 to 8 carbon atoms,
   c) one or more pH regulating additives and, optionally,
   d) a catalyst.

4. A process for the production of a mold having a non-stick coating, comprising
   (1) applying a coating to the internal surface(s) of a metal or plastic mold, wherein the coating comprises the reaction product of:
   a) one or more colloidal silicon dioxide solutions having an average particle size of 5 to 150 nanometers diameter,
   b) one or more organofunctional trialkoxysilanes corresponding to the general formula:

$$R'\!-\!Si(OR)_3$$

wherein:
   R': represents an optionally fluorinated alkyl substituent having 1 to 6 carbon atoms, a vinyl substituent, an acryloyl substituent, a methacryloyl substituent, a γ-glycidoxypropyl substituent, or a γ-methacryloxypropyl substituent, and each R: may be the same or different and represents an alkyl substituent having 1 to 8 carbon atoms, c) one or more pH regulating additives and, optionally, d) a catalyst; and (2) curing the coating of step (1).

5. The process of claim 4, wherein in component b):

R': represents a methyl substituent, an ethyl substituent, an acryloyl substituent, a methacryloyl substituent, or a fluoroalkyl substituent with 1 to 6 carbon atoms; and each R: may be the same or different and represents a methyl substituent, an ethyl substituent, an isopropyl substituent, or a sec-butyl substituent.

6. The process of claim 4, wherein at least 70 wt. %, based on 100 wt. % of b), comprises trialkoxyalkylsilanes.

7. The process of claim 4, wherein a) said colloidal silicon dioxide solutions have an average particle size of 10 to 30 nanometers diameter.

8. The process of claim 4, wherein the coating additionally comprises one or more polar solvents.

9. In a process for the production of a plastic molded part, comprising filling a mold with a reaction mixture suitable to form a plastic part, allowing the plastic part to cure and removing the plastic part from the mold, the improvement wherein the mold has a non-stick coating which comprises organomodified nanoscale $SiO_2$ particles.

* * * * *